United States Patent [19]

Hickman et al.

[11] Patent Number: 5,356,464
[45] Date of Patent: Oct. 18, 1994

[54] AQUEOUS INK COMPOSITIONS CONTAINING ANTI-CURL AGENTS

[75] Inventors: Mark S. Hickman, Vancouver, Wash.; Loren E. Johnson, Corvallis, Oreg.; John L. Stoffel, San Diego, Calif.; Ronald A. Askeland, San Diego, Calif.; Catherine B. Hunt, San Diego, Calif.; Howard Matrick, Hurleyville, N.Y.; Keshava A. Prasad, San Diego, Calif.; John T. Rich, San Diego, Calif.; Leonard Slevin, San Diego, Calif.; John R. Moffatt, Corvallis, Oreg.

[73] Assignee: E. I. Du Pont de Nemours and Company, Wilmington, Del.

[21] Appl. No.: 160,703

[22] Filed: Dec. 1, 1993

Related U.S. Application Data

[63] Continuation of Ser. No. 941,691, Sep. 8, 1992, abandoned.

[51] Int. Cl.$^5$ ............................................... C09D 11/02
[52] U.S. Cl. .................... 106/20 R; 106/22 R; 106/22 F; 106/22 H; 106/25 R
[58] Field of Search ............... 106/20 R, 22 F, 22 R, 106/22 H, 25 R

[56] References Cited

U.S. PATENT DOCUMENTS

| | | | |
|---|---|---|---|
| 4,176,361 | 11/1979 | Kawada et al. | 106/22 R |
| 4,279,653 | 7/1981 | Makishima et al. | 106/22 R |
| 4,308,061 | 12/1981 | Iwahashi et al. | 106/22 H |
| 4,381,946 | 5/1983 | Vehara et al. | 106/22 K |
| 4,431,450 | 2/1984 | Hasegawa et al. | 106/23 R |
| 4,464,203 | 8/1984 | Belde et al. | 106/499 |
| 4,971,628 | 11/1990 | Loftin | 106/22 F |
| 4,986,850 | 1/1991 | Iwata et al. | 106/25 R |
| 5,085,698 | 2/1992 | Ma et al. | 106/20 R |
| 5,100,469 | 3/1992 | Pontes et al. | 106/20 R |
| 5,106,417 | 4/1992 | Hauser et al. | 106/499 |
| 5,108,504 | 4/1992 | Johnson et al. | 106/22 R |
| 5,118,350 | 6/1992 | Prasad | 106/22 R |
| 5,145,558 | 8/1992 | Shirota et al. | 106/22 R |
| 5,169,437 | 12/1992 | You | 106/20 D |
| 5,180,425 | 1/1993 | Matrick et al. | 106/22 R |
| 5,207,824 | 5/1993 | Moffatt et al. | 106/20 R |
| 5,302,197 | 4/1994 | Wickramanayke et al. | 106/20 R |

FOREIGN PATENT DOCUMENTS

| | | |
|---|---|---|
| 0392876 | 10/1990 | European Pat. Off. |
| 106273 | 8/1980 | Japan |
| 42777 | 3/1982 | Japan |
| 57762 | 4/1982 | Japan |
| 10547 | 3/1987 | Japan |
| 332775 | 11/1992 | Japan |

OTHER PUBLICATIONS

Database WPI, Week 8216, Derwent Publications Ltd., London, GB; AN 82-31775E & JP-A-57 042 777 (Sakura Crapas) Mar. 10, 1982. Abstract.

Database WPI, Week 8220, Derwent Publications Ltd., London, GB; AN 82-39945E & JP-A-57 057 762 (Fuji Photo Film) Apr. 7, 1982. Abstract.

*Primary Examiner*—Helene Klemanski

[57] ABSTRACT

Aqueous ink compositions containing anti-curl agents substantially reduce or eliminate paper curl in plain-paper printed elements without adversely effecting storage stability, decap properties or print quality, and thus eliminate the need for expensive and bulky mechanical curl-arresting devices or special curl-resistant substrates. Printing the inks on plain-paper substrates is the sole step in a process for reducing paper curl in plain-paper printed elements.

11 Claims, No Drawings

AQUEOUS INK COMPOSITIONS CONTAINING ANTI-CURL AGENTS

This is a continuing application of Ser. No. 07/941,691 filed-Sep. 8, 1992 now abandoned.

FIELD OF THE INVENTION

This invention relates to aqueous inks, and more particularly to aqueous ink jet ink compositions which eliminate curl in printed plain-paper elements.

BACKGROUND OF THE INVENTION

Ink jet printing is a non-impact method that produces droplets of ink that are deposited on a substrate such as paper or transparent film in response to an electronic digital signal. Thermal or bubble jet drop-on-demand ink jet printers have found broad application as output for personal computers in the office and the home.

Aqueous inks used in ink jet printing have water as a major component. Water has the advantage of being non-toxic, non-combustible and environmentally sound relative to non-aqueous inks which are largely composed of organic solvents. Water is also an excellent media for dispersed pigments or dissolved dyes.

The use of water in large concentrations, however, also has several disadvantages. Water has a slow evaporation rate relative to low-boiling organic solvents, which reduces the rate of drying and, thus, the rate of printing. Water also interacts with paper to cause two major distortions known as paper cockle and paper curl. Paper cockle is a distortion in which bumps, indentations and other irregularities are randomly produced on the printed paper, giving the paper a "wrinkled" appearance. Curl is a phenomena in which the edges of the paper migrate towards the center of the paper. The direction of curl may be on the printed side of the paper, or it may be on the non-printed side (the latter being known as "reverse curl").

Curl may appear immediately after printing or may take a day or two to manifest. In its final state, the paper sheet may take the form of a tube. Curled paper cannot be stacked, sheet upon sheet, thereby causing much inconvenience to the user. Curled sheets are difficult to display or store and cannot be used in processes requiring near planarity, such as media feeding, tracking, and print alignment. Curl is most prevalent in solid fill printing and is therefore a more acute problem in graphics as opposed to text printing. For the same reason, it is mostly a concern in 4 color printing where graphics are prominent. The use of heating elements (commonly employed to increase the rate of drying of aqueous inks) are known to accelerate paper curl.

Various mechanical devices to reduce curl such as heated rollers and tension applicators have been tried. These devices are only marginally effective and add considerably to the cost and size of the printer. (Heated rollers used to reduce curl differ from the heaters used to increase drying rate; in the former heat is applied to both sides of the paper after printing whereas in the latter heat is applied during the printing process.)

It is also known to reduce curl by modifying the print media. This approach is highly undesirable, however, because it is expensive and because consumers have an overwhelming preference for printers which can use a wide variety of office papers, especially those sold into the electrophotographic copier paper market, or so-called "plain-paper" printers.

There is thus a need in the art for aqueous ink compositions which can be printed in full page graphics without producing paper curl, thus eliminating the need for expensive, ineffective and cumbersome mechanical devices or special print media.

The ink compositions of the present invention fulfil the above need without any deleterious effects such as inducing pluggage, kogation, inferior print quality, or instability in storage, and at much lower cost than can be obtained by equipment or media modifications.

SUMMARY OF THE INVENTION

In one aspect, this invention provides an aqueous ink composition comprising an aqueous carrier medium, a colorant and at least one anti-curl agent in an amount sufficient to substantially eliminate curl in plain-paper printed elements. The colorant may be a pigment dispersion or a dye. The anti-curl agents have a solubility in water of at least 4.5% (4.5 grams per 100 grams of water) at 25° C. and are preferably selected from the group consisting of:

(a) 1,3-diols; 1,3,5-triols; amino-1,3-diols; and polyoxyalkylene derivatives thereof having the following structure:

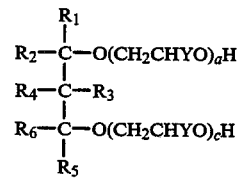

wherein $R_1$, $R_2$, $R_4$, $R_5$ and $R_6$ are independently H; $C_nH_{2n+1}$, where n=1–4; or $C_nH_{2n}O(CH_2CHYO)_bH$ where n=1–6 and b=0–25;

$R_3$=H; $C_nH_{2n+1}$ where n=1–4; $C_nH_{2n}O(CH_2CHYO)_bH$ where n=1–6 and b=0–25; or $(CH_2)_eNXZ$, where X and Z are independently H, $CH_3$, $C_2H_5$ or $C_2H_4O(CH_2CHYO)_dH$, where d=0–25 and e=0–3;

Y=H or $CH_3$;

a and c are independently 0–25; and wherein the total number of $CH_2CHYO$ units is 0–100;

(b) polyols and oxyalkylene derivatives thereof having the following structure:

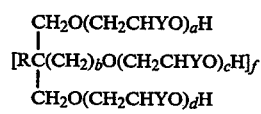

wherein R is independently H; $C_nH_{2n+1}$ where n=1–4; or $CH_2O(CH_2CHYO)_eH$;

Y=H or $CH_3$, b=0 or 1;

a, c, d and e are independently 0–40, f=1–6; and wherein the total number of $CH_2CHYO$ units is 0–100; with the proviso that when a, b, c and d=0 and f=1, R is not H and when a, c, and d=0 and b and f=1 then R is $CH_2O(CH_2CHYO)_eH$ and, e is not 0;

(c) compounds having the following structure:

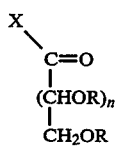

wherein X=H; OH; $CH_2O(CH_2CHYO)_aH$, where a=0-25; $O(CH_2CHYO)_bH$, where b=0-25; or OM where M is a metal cation;

n=2-7;

$R=(CH_2CHYO)_cH$, where Y=H or $CH_3$ and c=0-25; and wherein the total number of $CH_2CHYO$ units is 0-125;

(d) pyranosides and polyalkoxyalkylene derivatives thereof having the following structure:

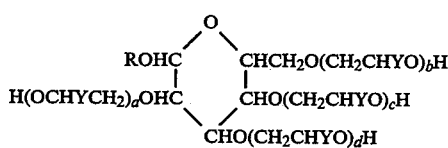

wherein R=H or $C_nH_{2n+1}$, where n=1-4;

a, b, c and d are independently 0-30;

Y=H or $CH_3$; and wherein the total number of $CH_2CHYO$ units is 0-120;

(e) poly(oxyalkylene) compounds having the following structure:

$H-(OCH_2CHY)_xOH$ wherein Y=H or $CH_3$, and x=3-20;

and (f) polyoxyalkylene derivatives of aliphatic polyamines having the structure:

$Z_1Z_2N(CH_2CH_2NZ_3)_nZ_4$ wherein $Z_1=(CH_2CHYO)_aH$;
$Z_2=(CH_2CHYO)_bH$;
$Z_3=(CH_2CHYO)_cH$;
$Z_4=(CH_2CHYO)_dH$;
where Y=H or $CH_3$;
a, b, c, and d are independently 0-20;
n=1-20; and
wherein the total number of $CH_2CHYO$ units is 3-200.

In another aspect, the invention comprises a process for reducing paper curl in plain-paper printed elements, consisting essentially of the step of applying an ink composition to a plain-paper substrate, wherein said ink composition comprises an aqueous carrier medium, a colorant and at least one anti-curl agent in an amount sufficient to substantially eliminate paper curl of said substrate.

In addition to the benefit of eliminating curl, the inks of this invention have surprisingly been found to be advantageous in more specific applications. For example, as explained more fully below, it has been found that "puddling" can be controlled in certain inks using the anti-curl agents herein described. "Puddling" refers to the spreading of ink from pen nozzles onto the cover plate, which can cause defects in printing. It has also been found that dye-based inks of this invention result in an increase in chroma and color gamut, which permits a wider range of dye concentrations and more flexibility in formulating the inks than heretofore was possible. (See U.S. Pat. No. 5,118,350)

Moreover, those skilled in the art will recognize that a number of the compounds recited above are known additives for ink jet inks for other purposes. For example, U.S. Pat. No. 5,100,469 teaches that the rate of drying of printed ink jet inks can be improved by adding 0.1 to about 8% by weight of meso-erythritol, trimethylol alkyl compounds, trimethylol alkylamines, or salts thereof. Similarly, Japanese Unexamined Patent Applications (Kokai) Nos. 2-14262 and 2-14260 teach fast drying dye-based ink jet inks having 0.5 to 25% by weight of trimethylolethane or trimethylolpropane, respectively, in combination with 1.0 to 10% by weight of a lower alcohol.

Many such compounds are also known humectants. Typically, however, these compounds have been used in concentrations too low to obtain the anti-curl advantages taught herein. Nevertheless, it has been found that these compounds, when used in sufficient concentration to produce the anti-curl effect, remain effective humectants.

DETAILED DESCRIPTION OF THE INVENTION

The aqueous inks of this invention are particularly suited for use in ink jet printers in general, and thermal ink jet printers in particular. The ink compositions encompasses both pigment and dye based inks.

The inks may be adapted to the requirements of a particular ink jet printer to provide a balance of light stability, smear resistance, viscosity, surface tension, optical density, low toxicity, high material compatibility and drying rate as is well known in the art.

Aqueous Carrier Medium

The aqueous carrier medium is water or a mixture of water and at least one water soluble organic solvent other than the anti-curl agents. Deionized water is commonly used.

Water-soluble organic solvents are well known, representative examples of which are disclosed in U.S. Pat. No. 5,085,698, the disclosure of which is incorporated herein by reference. Selection of a suitable mixture of water and water soluble organic solvent depends upon requirements of the specific application, such as desired surface tension and viscosity, the selected colorant, drying time of the ink, and the media substrate onto which the ink will be printed. A mixture of a water soluble organic solvent having at least two hydroxyl groups (e.g., diethylene glycol) and deionized water is preferred as the aqueous carrier medium.

In the event that a mixture of water and organic solvent is used as the aqueous carrier medium, water would comprise between 30% and 95%, preferably 60% to 95%, by weight of the aqueous medium, based on the total weight of the aqueous carrier medium including the weight of the anti-curl agents.

The amount of aqueous carrier medium (including the weight of the anti-curl agents) is in the range of approximately 70 to 99.8%, preferably approximately 84 to 99.8%, based on total weight of the ink when an organic pigment is selected, approximately 25 to 99.8%, preferably approximately 70 to 99.8% when an inorganic pigment is selected and 80 to 99.8% when a dye is selected.

Colorants

The colorants useful in the present invention are pigment dispersions and dyes. The term "pigment" means a colorant that is applied in an insoluble particulate state. The term "dye" means a colorant that is applied in a soluble state.

The term "pigment dispersion", as is known in the art and as used herein, refers to a mixture of a pigment and a dispersing agent. Preferably, the dispersing agent is a polymeric dispersant.

Dyes

Dyes useful in this invention include anionic, cationic, amphoteric and non-ionic dyes. Such dyes are well known to those of ordinary skill in the art. Anionic dyes are those dyes which in aqueous solution yield colored anions and cationic dyes are those which in aqueous solution yield colored cations. Typically anionic dyes contain carboxylic or sulfonic acid groups as the ionic moiety. Cationic dyes usually contain quaternary nitrogen groups.

Amphoteric dyes may be anionic, cationic or have both charges as a function of solution pH. Certain non-ionic dyes have sufficient water solubility to be used in aqueous inks. Dyes with poor solubility in the aqueous carrier medium are treated as pigments and may be dispersed for use in aqueous inks in the same manner as discussed below.

All types of dyes mentioned above are typically classified by their end use. Some of the more useful classes of dyes in this invention are Acid, Basic, Direct, Food, Disperse, Mordant, Vat, Solvent and Reactive dyes. Any of these classes of dyes may have one or more distinct functional groups such as nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds, diphenylmethane compounds, acridine compounds, quinoline compounds, methine or polymethine compounds, indamine or indophenyl compounds, among others, all of which are well known to those skilled in the art.

The color and amount of dye used in the ink composition is largely a function of choice, being primarily dependent upon the desired color of the print achieved with the ink, the purity of the dye and its strength. Low concentrations of dye may not give adequate color vividness. High concentrations may result in poor printhead performance or unacceptably dark colors. The dye is present in the amount of 0.0 to 20%, by weight, preferably 0.05 to 8%, by weight, more preferably 0.1 to 5%, by weight, based on the total weight of the ink.

Pigments

Useful pigments for the dispersion comprise a wide variety of organic and inorganic pigments, alone or in combination. Dyes which are substantially insoluble in the aqueous carrier medium may also be mentioned here.

The pigment particles should be sufficiently small to permit free flow of the ink through the ink jet printing device, especially at the ejecting nozzles that usually have a diameter ranging from 10 to 50 microns. Particle size also has an influence on the stability of the pigment dispersion. Brownian motion of minute particles will help prevent the particles from settling. Small particle size is also desirable for maximum color strength. The range of useful particle size is approximately 0.005 micron to 15 microns. Preferably, the pigment particle size should range from 0.005 to 5 micron and most preferably, from 0.01 to 0.5 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in the aforementioned U.S. Pat. No. 5,085,698.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

In the case of organic pigments, the ink may contain up to approximately 30% pigment by weight, but will generally be in the range of approximately 0.1 to 15% preferably approximately 0.1 to 8% by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments.

Dispersants

Polymeric dispersants are the preferred dispersants for pigments. Polymeric dispersants suitable for practicing the invention include AB, BAB or ABC block copolymers. Most preferred are polymeric dispersants made by the group transfer polymerization process because these are free from higher molecular weight species that tend to plug pen nozzles.

Suitable AB or BAB block copolymers and the synthesis thereof are disclosed in the aforementioned U.S. Pat. No. 5,085,698. Suitable ABC triblock copolymers and their synthesis are disclosed in Ma et al., U.S. Ser. No. 07/838,181 filed Feb. 20, 1992, and U.S. Ser. No. 07/838,165, filed Feb. 20, 1992, the disclosures of which are incorporated herein by reference.

Although random copolymers can be used as dispersing agents, they are not as effective in stabilizing pigment dispersions as the block polymers, and therefore are not preferred.

The polymeric dispersant is generally present in the range of approximately 0.1 to 30% by weight of the total ink composition, preferably in the range of approximately 0.1% to 8% by weight of the total ink composition. Dispersion stability of the pigment particles is adversely affected if insufficient polymeric dispersant is present.

In addition to, or in place of the preferred polymeric dispersant compounds, surfactant compounds may be used as dispersants. These may be anionic, cationic, nonionic, or amphoteric surfactants. A detailed list of non-polymeric as well as some polymeric dispersants is provided in the section on dispersants, pages 110–129, 1990 McCutcheon's Functional Materials, North American Edition, Manufacturing Confection Publishing Co., Glen Rock, N.J., 07452, the disclosure of which is incorporated herein by reference.

Anti-Curl Agents

The anti-curl agents suitable for use in the present invention contain polyhydroxy groups and/or polyoxyalkylene groups derived by reaction of the polyhydroxy groups with alkylene oxides. The compounds have a solubility in water of at least 4.5% (4.5 parts anti-curl agent in 100 parts of water) at 25° C. and are represented by the classes of compounds discussed below.

(a) 1,3-diols, 1,3,5-triols, amino-1,3-diols or their polyoxyalkylene derivatives having the structure recited above comprise the first class of anti-curl agents suitable for use in the present invention. Examples of anti-curl agents within this class include: 2,2-dimethyl-1,3-propanediol, 2-methyl-2-ethyl-1,3-propanediol, 2,2-diethyl-1,3-propanediol, 2-methyl-2-propyl-1,3-propanediol, 1,2,4-butanetriol, 3-methyl-1,3,5-pentanetriol, 1,3,5-pentanetriol, 2,4-pentanediol, 2-methyl-2,4-pentanediol, 1,1,1-tris(hydroxymethyl) aminomethane, 2,2-bis(hydroxymethyl)-2,2 ', 2''-nitrilotriethanol, 2-amino-2-methyl-1,3-propanediol and 2-amino-2-ethyl- 1,3-propanediol.

The amino compounds may be neutralized fully or partially with mineral acids such as hydrochloric acid. The polyoxyalkylene compounds are derived from the above mentioned list of compounds.

(b) Another class of anti-curl agents suitable for use in the present invention comprise polyols and oxyalkylene derivatives thereof having the above-recited structure. In this class, the term "polyol" means compounds having from 3 to 8 hydroxyl groups wherein the hydroxyl groups or hydroxymethyl groups are attached to the main chain. By "oxyalkylene derivatives" we mean one or more oxyalkylene repeating units substituting for the hydrogen on the hydroxyl group.

Some examples of the polyhydroxy compounds in this class include: 2-hydroxymethyl-1,3-propanediol, 2-ethyl-2-(hydroxymethyl) -1,3-propanediol, 2-methyl-2-(hydroxymethyl)-1,3-propanediol, trimethylolbutane, meso-erythritol, D-, L-, and DL-threitol, adonitol, D-and L-arabitol, xylitol, dulcitol, L-iditol, D-mannitol, D-sorbitol and racemic sorbitol.

The polyoxyalkylene derivatives are derived from the polyhydroxy compounds from the above-mentioned group. Unreacted glycerol was not found to be an effective anti-curl agent and unreacted pentaerythritol does not have sufficient water solubility. The polyoxyalkylene derivatives of glycerol and pentaerythritol, however, have been found to be useful anti-curl agents. Other useful triols for oxyalkylation are trimethylolpropane, trimethylolethane and 1,2,6-hexanetriol.

Some commercial examples of polyol/alkylene oxide condensates include Liponic ® EG-1, Liponic ®SO-20 (Lipo Chemicals Co.; Paterson, N.J.); Photonol ® PHO-7149, Photonol PHO-7155 (Henkel Corporation; Ambler, Pa.); Voranol ® 230-660, Voranol ® 234-630 (Dow Chemical Co.; Midland, Mich.); Fomrez ® T-279, Fomrez ® T-315, Fomrez ® ET-190 , and Fomrez ® ET-250 (Witco Corporation, Organics Division; New York, N.Y.)

(c) Aldose, ketose, aldonic acid, soluble metal aldonate salt, and polyalkoxyalkylene derivatives thereof comprise the anti-curl agents in class (c). Examples of these compounds are D- and L- forms of erythrose, threose, arabinose, ribose, lyxose, xylose, glucose, mannose, altrose, allose, talose, galactose, idose, gulose and the corresponding aldonic acids of the above. Examples of the latter are D-gluconic acid, D-mannonic acid, D-altronic acid and D-allonic acid. Example of a soluble metal aldonate salt is potassium gluconate.

(d) Pyranosides and their polyalkoxyalkylene derivatives comprise the next class of anti-curl agents for use in the present invention, examples of which include methyl alpha-D-glucoside and methyl beta-D-alloside. Polyoxyalkylene derivatives include the Glucam ® products available from Amerchol, Edison N.J.

(e) Anti-curl agents within class (e) are poly(alkoxyethylene) compounds having the structure recited above. Representative compounds within this class include triethylene glycol, tetraethylene glycol, pentaethylene glycol, hexaethylene glycol, octaethylene glycol, polyethylene glycol 200, polyethylene glycol 400, polyethylene glycol 1000 and the like. Diethylene glycol is not an effective anti-curl agent. Higher molecular weight compounds impart excessive viscosity to the inks, can cause flocculation of the pigment dispersion, and are less effective anti-curl agents. Therefore, such compounds are not preferred.

(f) The final class of anti-curl agents comprises polyoxyalkylene derivatives of an aliphatic polyamines, such as polyoxyalkylene derivatives of ethylene diamine, diethylenetriamine, triethylenetetramine and the like. A commercial example of a polyalkylene derivative of triethylenetetramine is Fomrez ® K-22-66 (Witco Corporation, Organics Division; New York, N.Y.). The amine groups may be neutralized fully or partially with mineral acids, such as hydrochloric acid.

Mixtures of compounds, both within and among the classes mentioned are also useful in this invention. Especially preferred are mixtures of one compound from classes (a) or (b) with one compound from class (e), where one of the selected compounds is present in an amount of 10–90%, preferably 25–75%, based on the total weight of the anti-curl mixture.

The polyoxyalkylene derivatives of the compounds in classes (a) through (f) are prepared either from ethylene or propylene oxide or combinations of both oxides, although ethylene oxide or mixtures of ethylene oxide and propylene oxide are preferred. Reaction with a single alkylene oxide can produce mixtures of compounds with varying degree of oxyalkylation on each hydroxyl group. Accordingly, the structures recited are based on average compositions which may contain a range of oxyalkylene units. Random and block copolymer chains of propylene and ethylene oxides may be employed. For example, a polyhydroxy compound may be reacted first with propylene oxide then in sequence terminated with ethylene oxide.

In many cases the various hydroxyl groups or their alkoxide salts are in non-equivalent positions. Therefore they may react with the alkylene oxide at different rates depending upon steric factors and nucleophilicity. Thus various hydroxyl groups in the same compound may have differing degrees of polymerization.

To be effective at substantially eliminating paper curl, the anti-curl agents must be present in an amount of at least 10% by weight, based on the total weight of the ink composition. Acceptable ranges for the anti-curl agents are 10-75%, preferably 12-55%, and most preferably 15-30% based on the total weight of ink.

OTHER INGREDIENTS

The ink may contain other ingredients. For example, the surfactants mentioned above may be used to alter surface tension as well as maximize penetration. However, because surfactants may destabilize pigment dispersions, care should be taken to insure compatibility of the surfactant with the other ink components. In aqueous inks, the surfactants may be present in the amount of 0.01-5% and preferably 0.2-3%, based on the total weight of the ink.

Biocides may be used in the ink compositions to inhibit growth of microorganisms. Dowicides ® (Dow Chemical, Midland, Mich.), Nuosept ® (Huls America, Inc., Piscataway, N.J.), Omidines ® (Olin Corp., Cheshire, Conn.), Nopcocides ® (Henkel Corp., Ambler, Pa.), Troysans ® (Troy Chemical Corp., Newark, N.J.) and sodium benzoate are examples of such biocides.

In addition, sequestering agents such as EDTA may also be included to eliminate deleterious effects of heavy metal impurities. Other known additives, such as viscosity modifiers and other acrylic or non-acrylic polymers may also be added to improve various properties of the ink compositions. As noted above, many of the anti-curl agents of this invention are effective humectants for many ink jet ink formulations.

INK PREPARATION

The ink compositions of the present invention are prepared in the same manner as other ink jet ink compositions. If a pigment dispersion is used as the colorant, the dispersion is prepared by premixing the selected pigment(s) and dispersant in water. The dispersion step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium, as described in U.S. Pat. No. 5,026,427. Other cosolvents that may improve penetration or decap properties may be present during the dispersion step.

If a dye is used as the colorant, there is no dispersant present and no need for pigment deaggregation. The dye-based ink is prepared in a well agitated vessel rather than in dispersing equipment.

It is generally desirable to make the ink jet inks in concentrated form, which is subsequently diluted with a suitable liquid to the appropriate concentration for use in the ink jet printing system. By dilution, the ink is adjusted to the desired viscosity, color, hue, saturation density, and print area coverage for the particular application.

INK PROPERTIES

Jet velocity, separation length of the droplets, drop size, and stream stability are greatly affected by the surface tension and the viscosity of the ink. Ink jet inks suitable for use with ink jet printing systems should have a surface tension in the range of about 18 dyne/cm to about 70 dyne/cm and, more preferably, in the range 20 dyne/cm to about 50 dyne/cm at 20° C. Acceptable viscosities are no greater than 20 cP, and preferably in the range of about 1.0 cP to about 10.0 cP at 20° C. with appropriate rheology for both image setting and thermal ink jet firing refill frequencies.

The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus.

Although particularly advantageous for use in printing plain-paper elements, the inks of this invention are also suitable for use with a variety of print media, such as fabrics, transparencies, etc. The printed ink images have clear color tones and high density. The inks are compatible with the component parts of ink jet printing devices and they are essentially odorless.

As noted above, the ink compositions of the present invention have surprisingly been found to offer additional benefits. For example, an ink set comprising cyan, magenta and yellow dye-based ink compositions of this invention result in a marked improvement in the plain-paper color gamut when compared to dye-based inks having the same dye concentration and no anti-curl agent. This increased color gamut allows for more vivid primary and secondary colors and exhibits less variation across papers. Adjusting the dye concentration in such inks can further improve color gamut and a more symmetrical color space is obtained. An ink jet ink set having the above qualities may comprise a cyan ink comprising 1.75 to 2.5% of Acid Blue 9 dye, a yellow ink comprising 1.75 to 3% of Acid Yellow 23, and a magenta ink comprising 1 to 3% of Reactive Red 180 and 0.3 to 1.5% of Acid Red 52.

Another surprising advantage of the inks of this invention is their improved puddling characteristics. It is known from U.S. Ser. No. 07/845,332, filed Apr. 28, 1992, (the disclosure of which is incorporated herein by reference) that anionic polymers may be added to anionic dye-containing inks to provide improved puddling properties. It has been found that the same improvement in puddling can be obtained with the inks of the present invention with significantly less polymer concentration (e.g., approximately 0.25% polymer compared to approximately 1.0% polymer). The use of a reduced polymer concentration results in better decap performance, greater formation flexibility and reduced costs.

EXAMPLES

The invention will now be further illustrated by the following examples, in which parts and percentages are by weight unless otherwise noted. All ingredients used in the ink formulations were obtained from Aldrich Chemical, Milwaukee, Wis., unless otherwise indicated.

PROCEDURE A

Butyl methacrylate//methacrylic acid (BMA//MAA 10//10) AB block polymer (M.W. 2400)

A 12-liter flask was equipped with a mechanical stirrer, thermometer, N₂ inlet, drying tube outlet, and addition funnels. Tetrahydrofuran ("THF"), 3750 gm, and p-xylene, 7.4 gm, were charged to the flask. A tetrabutyl ammonium m-chlorobenzoate catalyst (3.0 ml of a 1.0M solution in acetonitrile) was then added. Initiator, 1,1-bis(trimethylsiloxy)-2-methyl propene, 291.1 gm (1.25M) was injected. Feed I [tetrabutyl ammonium m-chlorobenzoate, 3.0 ml of 1.0M solution in acetonitrile] was started at zero minutes and added over 150 minutes. Feed II [trimethylsilyl methacrylate, 1976 gm (12.5M)] was started at zero minutes and added over 35 minutes. One hundred and eighty minutes after Feed II was completed (over 99% of the monomers had reacted) Feed III [butyl methacrylate, 1772 gm (12.5M)] was started and added over 30 minutes.

At 400 minutes, 780 gm of dry methanol were added to the above solution and distillation begun. During the first stage of distillation, 1300.0 gm of material with a boiling point of below 55° C. were removed from the flask. The theoretical amount of methoxytrimethylsilane (BP=54° C.) to be removed was 1144.0 gm. Distillation continued during the second stage while the boiling point increased to 76° C. During the second stage of distillation, 5100 gm of i-propanol was added. A total of 8007 gm of solvent were removed.

This procedure resulted in 52.5% BMA//MMA AB block polymer solution in THF and i-propanol, which was used to prepare the pigment concentrate as described below.

A 10% polymer solution was made by neutralizing 19.05 gm of the above solution with 3.86 gm of 45.6% KOH mixed with 77.1 gm of deionized water. This solution was used for Examples 13, 18, 27 and 28.

PROCEDURE B

Butyl methacrylate//butyl methacrylate-co-methacrylic acid (BMA//BMA/MAA 10//5/10) AB block copolymer (M.W. 3100)

A 3-liter flask was equipped with a mechanical stirrer, thermometer, N₂ inlet, drying tube outlet, and addition funnels. Tetrahydrofuran (THF), 780 gm, and p-xylene, 3.6 gm, were charged to the flask. The catalyst tetrabutyl ammonium m-chlorobenzoate (3.2 ml of 1.0M solution in acetonitrile) was then added. Initiator, 1,1-bis(trimethylsiloxy)-2-methyl propene, 72.0 gm (0.62M) was injected. Feed I [tetrabutyl ammonium m-chlorobenzoate, 3.2 ml of a 1.0M solution in acetonitrile] was started and added over 130 minutes. Feed II [n-butyl methacrylate, 220 gm (1.55M), and trimethylsilyl methacrylate, 490 gm (3.1M)] was started at 0.0 minutes and added over 40 minutes. Thirty minutes after Feed II was completed (over 99% of the monomers had reacted), Feed III [n-butyl methacrylate, 440 gm (3.1M)] was started and added over 30 minutes.

At 240 minutes, 216 gm of dry methanol was added to the above solution and distillation was begun. During the first stage of distillation, 210.0 gm of material with a boiling point of below 55° C. was removed from the flask. Distillation continued during the second stage while the boiling point increased to 76° C. During this stage, 900 gm of i-propanol was added and distillation continued until a total of 1438 gms of solvent had been removed. This made a BMA//BMA/MAA 10//5/10 polymer at 5 57.7% solids.

A 10% polymer stock solution was made by neutralizing 17.33 gm of the above solution with 4.63 gm of 45.6% KOH mixed with 78.0 gm of deionized water. This solution was used for Example 17.

Examples 1-25

In these Examples, all of the dye-based inks were prepared by mixing all of the ink components, or aqueous stock solutions thereof together with stirring until a homogeneous solution was obtained. To this solution was added the required amount of water with stirring so that the total weight of the ink was 100 grams. Dyes were obtained from commercial manufacturers. Purified dyes were used.

All of the pigment-based inks (Examples 19-23) were prepared from a dispersion concentrate that contained 46.1 gm of diethylene glycol, 632 gm of deionized water, 150 gm of FW18 carbon black pigment (DeGussa Corp., Allendale, N.J.) and 142.9 gm of the 52.5% polymer solution from Procedure A, neutralized with 29.0 gm of 45.6% KOH.

The inks were tested by loading them in thermal ink jet pens having a resistor size of 42-50 microns and an orifice of 30-40 microns. The pens were placed in an ink jet printer which employs heat to decrease the length of time needed to dry the print. No mechanical curl reduction devices were employed.

A full page of double density blackout having quarter inch margins was printed using a variety of plain-papers (identified below) in order to simulate a worse case situation. The printed paper was placed face up on a flat surface and the amount of curl was determined by measuring the distance between the edge of the paper and the flat surface at intervals of 1 hour, 24 hours, 48 hours, 72 hours and 96 hours. The acceptable amount of curl was defined as being less than 40 mm, based upon esthetics, readability and ease of handling.

Example 1 - Control
- 8.0 grams Diethylene glycol monobutyl ether
- 2.2 grams Acid Blue 9, CAS #3844-45-9
- 0.3 grams Biocide
- 89.5 grams Deionized water

Example 2
- 8.0 grams Diethylene glycol monobutyl ether
- 15.0 grams 2-ethyl-2-(hydroxymethyl)-1,3-propanediol
- 2.2 grams Acid Blue 9
- 0.3 grams Biocide
- 74.5 grams Deionized water

Example 3 - Control
- 10.0 grams Diethylene glycol
- 4.0 grams Diethylene glycol monobutyl ether
- 0.2 grams Silwet ® L-77, (Union Carbide Corp)
- 2.2 grams Acid Blue 9
- 83.6 grams Deionized water

Example 4 - Control
- 10.0 grams 3,3-dimethyl-1,2-butanediol
- 4.0 grams Diethylene glycol monobutyl ether
- 0.2 grams Silwet ® L-77
- 2.2 grams Acid Blue 9
- 83.6 grams Deionized water

Example 5
- 10.0 grams 2-ethyl-2-hydroxymethyl-1,3-propanediol
- 4.0 grams Diethylene glycol monobutyl ether
- 0.2 grams Silwet ® L-77
- 2.2 grams Acid Blue 9
- 83.6 grams Deionized water

Example 6
- 10.0 grams Triethylene glycol
- 4.0 grams Diethylene glycol monobutyl ether
- 0.2 grams Silwet ® L-77
- 2.2 grams Acid Blue 9
- 83.6 grams Deionized water

Example 7
- 10.0 grams Tetraethylene glycol

-continued 4.0 grams Diethylene glycol monobutyl ether
0.2 grams Silwet ® L-77
2.2 grams Acid Blue 9
83.6 grams Deionized water Example 8
10.0 grams Polyethylene glycol MW 400
4.0 grams Diethylene glycol monobutyl ether
0.2 grams Silwet ® L-77
2.2 grams Acid Blue 9
83.6 grams Deionized water Example 9
10.0 grams Sorbitol
4.0 grams Diethylene glycol monobutyl ether
0.2 grams Silwet ® L-77
2.2 grams Acid Blue 9
83.6 grams Deionized water Example 10
10.0 grams Tris(hydroxymethyl)aminomethane
4.0 grams Diethylene glycol monobutyl ether
0.2 grams Silwet ® L-77
2.2 grams Acid Blue 9
83.6 grams Deionized water Example 11
7.5 grams Neopentyl glycol
7.5 grams Tetraethylene glycol
4.0 grams Diethylene glycol monobutyl ether
0.2 grams Silwet ® L-77
2.2 grams Acid Blue 9
78.6 grams Deionized water Example 12
7.5 grams 2-methyl-2-(hydroxymethyl)-1,3-propanediol
7.5 grams Tetraethylene glycol
4.0 grams Diethylene glycol monobutyl ether
0.2 grams Silwet ® L-77
2.2 grams Acid Blue 9
78.6 grams Deionized water Example 13
7.5 grams 2-methyl-2-propyl-1,3-propanediol
7.5 grams Tetraethylene glycol
4.0 grams Diethylene glycol monobutyl ether
0.2 grams Silwet ® L-77
2.2 grams Acid Blue 9
78.6 grams Deionized water Example 14
7.5 grams 2,2-diethyl-1,3-propanediol
7.5 grams Tetraethylene glycol
4.0 grams Diethylene glycol monobutyl ether
0.2 grams Silwet ® L-77
2.2 grams Acid Blue 9
78.6 gram Deionized water Example 15
7.5 grams 2-ethyl-2-(hydroxymethyl)-1,3-propanediol
7.5 grams Tetraethylene glycol
4.0 grams Diethylene glycol monobutyl ether
0.2 grams Silwet ® L-77
2.2 grams Acid Blue 9
78.6 grams Deionized water Example 16
18.0 grams 2-ethyl-2-(hydroxymethyl)-1,3-propanediol
2.0 grams Dipropylene glycol
0.5 grams Silwet ® L-7607
2.5 grams Block polymer from Procedure A
2.2 grams Acid Blue 9
0.3 grams Biocide
74.5 grams Deionized water Example 17
16.0 grams 3-methyl-1,3,5-pentanetriol, (Fluka Chemical)
0.8 grams Silwet ® L-7607
4.0 grams Block polymer from Procedure B
2.2 grams Acid Blue 9
0.3 grams Biocide
76.7 grams Deionized water Example 18
4.0 grams 2-ethyl-2-hydroxymethyl-1,3-propanediol
2.0 grams 3-methyl-1,3,5-pentanetriol,
0.8 grams Silwet ® L-7607
4.0 grams Block polymer from Procedure A
2.2 grams Acid Blue 9
0.3 grams Biocide
76.7 grams Deionized water Example 19 - Control
18.7 grams Diethylene glycol
26.7 grams Pigment dispersion concentrate
55.8 grams Deionized water Example 20
17.5 grams 2-ethyl-2-(hydroxymethyl)-1,3-propanediol
26.7 grams Pigment dispersion concentrate
55.8 grams Deionized water Example 21
17.5 grams alpha-D-Glucose
26.7 grams Pigment dispersion concentrate
55.8 grams Deionized water Example 22
17.5 grams Methyl-alpha-D-glucoside
26.7 grams Pigment dispersion concentrate
55.8 grams Deionized water Example 23
17.5 grams D-Gluconic acid, Potassium salt
26.7 grams Pigment dispersion concentrate
55.8 grams Deionized water Example 24
20.0 grams Tris(hydroxymethyl)aminomethane
1.0 grams Silwet ® L-7607
2.2 grams Acid Blue 9
0.3 grams Biocide
76.5 grams Deionized water Example 25
12.0 grams Tris(hydroxymethyl)aminomethane-HCl
3.0 grams Tris(hydroxymethyl)aminomethane
0.3 grams Aerosol ® OT (Fisher Scientific)
2.2 grams Acid Blue 9
0.3 grams Biocide
82.2 grams Deionized water

TABLE 1

| Example | Temp/RH[3] | Paper | Paper Curl (mm) | | | | |
|---|---|---|---|---|---|---|---|
| | | | 1 hr | 24 hr | 48 hr | 72 hr | 96 hr |
| 1 (Control) | Ambient | GB[1] | >90°[4] | | | | |
| | | SH[2] | >90° | | | | |
| 2 | Ambient | GB | 20 | 5 | | | |
| | | SH | 30 | 17 | | | |
| 3 (Control) | Ambient | GB | 31 | 60 | | | |
| | | SH | 44 | 100 | | | |
| 4 (Control) | Ambient | GB | >90° | | | tube | |
| | | SH | >90° | | | tube | |
| 5 | Ambient | GB | 18 | | | 8 | |
| | | SH | 37 | | | 35 | |
| 6 | Ambient | SH | 15 | | | 50 | |
| 7 | Ambient | SH | 20 | | | 30 | |
| 8 | Ambient | SH | 50 | | | 35 | |
| 9 | Ambient | GB | 27 | | | 14 | |
| | | SH | 44 | | | 33 | |
| 10 | Ambient | GB | 19 | | | 14 | |
| | | SH | 34 | | | 24 | |
| 11 | Ambient | GB | 14 | 17 | | | 15 |
| | | SH | 16 | 35 | | | 35 |
| 12 | Ambient | GB | 7 | 4 | | | 3 |
| | | SH | 6 | 3 | | | 4 |
| 13 | Ambient | GB | 14 | 28 | | | 41 |
| | | SH | 10 | 30 | | | 26 |
| 14 | Ambient | GB | 17 | 26 | | | 29 |
| | | SH | 15 | 22 | | | 26 |
| 15 | Ambient | GB | 4 | 3 | | | 2 |
| | | SH | 6 | 3 | | | 2 |
| 16 | Ambient | GB | 13 | 3 | | | |
| | | SH | 18 | 8 | | | |
| 16 | 15° C./20% | GB | 37 | 30 | | | |
| | | SH | 20 | 18 | | | |
| 17 | 15° C./20% | GB | 37 | | | | |
| | | SH | 25 | | | | |
| 18 | 15° C./20% | GB | 28 | | 19 | | |
| | | SH | 16 | | 10 | | |
| 19 (Control) | Ambient | GB | 3 | 66 | tube | | |
| | | SH | 3 | tube | tube | | |
| 20 | Ambient | GB | 16 | 6 | 5 | | |
| | | SH | 13 | 6 | 6 | | |
| 21 | Ambient | GB | 11 | 7 | 5 | | |

TABLE 1-continued

| Example | Temp/RH[3] | Paper | 1 hr | 24 hr | 48 hr | 72 hr | 96 hr |
|---|---|---|---|---|---|---|---|
| | | SH | 26 | 14 | 10 | | |
| 22 | Ambient | GB | 19 | 30 | 31 | | |
| | | SH | 20 | 32 | 35 | | |
| 23 | Ambient | GB | 24 | 18 | 14 | | |
| | | SH | 24 | 16 | 13 | | |
| 24 | 15° C./20% | GB | 13 | | | | |
| | | SH | 17 | | | | |
| 25 | Ambient | GB | 8 | 1 | | | |
| | | SH | 9 | 4 | | | |

1. GB = Gilbert ® bond paper (25% cotton; Style 1057 (Mead Company, Dayton, Ohio)
2. SH = Springhill Relay DP (International Paper, Tuxedo, NY)
3. Conditions for printing and storage.
4. >90° means the edges curled upwards and inwards in the shape of a "U"

Cyan:
7.0 grams Diethylene glycol monobutyl ether
1.0 grams Silwet ® L-7607
2.25 grams Acid Blue 9
0.3 grams Biocide
89.45 grams Deionized water Magenta:
7.0 grams Diethylene glycol monobutyl ether
1.0 grams Silwet ® L-7607
0.6 grams Acid Red 52, CAS #3520-42-1
2.75 grams Reactive Red 180, CAS #85586-40-9
0.3 grams Biocide
88.35 grams Deionized water Yellow:
7.0 grams Diethylene glycol monobutyl ether
1.0 grams Silwet ® L-7607
2.5 grams Acid Yellow 23, CAS #1934-21-0
0.3 grams Biocide
89.2 grams Deionized water Cyan:
18.0 grams 2-ethyl-2-(hydroxymethyl)-1,3-propanediol
2.0 grams Dipropylene glycol
0.5 grams Silwet ® L-7607
2.5 grams Block polymer from Procedure A
2.25 grams Acid Blue 9
0.3 grams Biocide
74.45 grams Deionized water Magenta:
18.0 grams 2-ethyl-2-(hydroxymethyl)-1,3-propanediol
2.0 grams Dipropylene glycol
0.5 grams Silwet ® L-7607
2.5 grams Block polymer from Procedure A
0.6 grams Acid Red 52
2.75 grams Reactive Red 180
0.3 grams Biocide
73.35 grams Deionized water Yellow:
18.0 grams 2-ethyl-2-(hydroxymethyl)-1,3-propanediol
2.0 grams Dipropylene glycol
0.5 grams Silwet ® L-7607
2.5 grams Block polymer from Procedure A
2.5 grams Acid Yellow 23
0.3 grams Biocide
74.2 grams Deionized water Cyan:
18.0 grams 2-ethyl-2-(hydroxymethyl)-1,3-propanediol
2.0 grams Dipropylene glycol
0.5 grams Silwe ® L-7607
2.5 grams Block polymer from Procedure A
2.0 grams Acid Blue 9
0.3 grams Biocide
74.7 grams Deionized water Magenta:
18.0 grams 2-ethyl-2-(hydroxymethyl)-1,3-propanediol
2.0 grams Dipropylene glycol
0.5 grams Silwet ® L-7607
2.5 grams Block polymer from Procedure A
1.0 grams Acid Red 52
1.6 grams Reactive Red 180
0.3 grams Biocide
74.1 grams Deionized water Yellow:
18.0 grams 2-ethyl-2-(hydroxymethyl)-1,3-propanediol
2.0 grams Dipropylene glycol
0.5 grams Silwet ® L-7607
2.5 grams Block polymer from Procedure A
2.75 grams Acid Yellow 23
0.3 grams Biocide
73.95 grams Deionized water

TABLE 2

| Examle | Temp/RH[3] | Paper | 1 hr | 24 hr | 48 hr | 72 hr | 96 hr |
|---|---|---|---|---|---|---|---|
| 26 (Control) | Ambient | GB | tube | tube | | | |
| | | SH | tube | tube | | | |
| 27 | 15° C./20% | GB | 37 | 30 | | | |
| | | SH | 20 | 18 | | | |

TABLE 3

| Example | Paper | Color | Hue | Value | Chroma | Gamut |
|---|---|---|---|---|---|---|
| 26 | GB[1] | Red | 5.57 R | 5.12 | 12.34 | 775 |
| | | Green | 3.52 G | 5.16 | 9.97 | |
| | | Blue | 8.23 PB | 3.41 | 9.81 | |
| | | Cyan | 8.19 B | 5.80 | 11.57 | |
| | | Magenta | 3.59 RP | 5.27 | 14.77 | |
| | | Yellow | 6.72 Y | 9.13 | 11.42 | |
| | SH[2] | Red | 5.89 R | 5.12 | 11.71 | 729 |
| | | Green | 3.38 G | 5.15 | 9.79 | |
| | | Blue | 8.04 PB | 3.46 | 9.21 | |
| | | Cyan | 7.68 B | 5.68 | 11.21 | |
| | | Magenta | 3.88 RP | 5.26 | 13.97 | |
| 26 | SH HAM[3] | Yellow | 6.95 Y | 9.05 | 11.03 | |
| | | Red | 5.89 R | 5.13 | 11.40 | 683 |
| | | Green | 3.16 G | 5.22 | 9.48 | |
| | | Blue | 8.17 PB | 3.56 | 9.01 | |
| | | Cyan | 8.01 B | 5.72 | 10.92 | |
| | | Magenta | 3.68 RP | 5.32 | 13.63 | |
| | | Yellow | 6.36 Y | 8.94 | 10.89 | |
| 27 | GB | Red | 5.94 R | 5.01 | 14.11 | 918 |
| | | Green | 2.45 G | 5.14 | 11.54 | |
| | | Blue | 8.95 PB | 2.88 | 10.03 | |
| | | Cyan | 7.88 B | 5.64 | 12.16 | |
| | | Magenta | 4.75 RP | 5.02 | 15.59 | |
| | | Yellow | 7.51 Y | 9.13 | 12.08 | |
| | SH | Red | 6.29 R | 4.94 | 14.48 | 939 |
| | | Green | 2.17 G | 5.10 | 11.79 | |
| | | Blue | 9.11 PB | 2.69 | 10.04 | |
| | | Cyan | 7.70 B | 5.55 | 11.98 | |
| | | Magenta | 4.92 RP | 4.95 | 15.68 | |
| | | Yellow | 7.34 Y | 9.17 | 12.43 | |
| | HAM | Red | 6.30 R | 4.93 | 14.06 | 905 |
| | | Green | 2.23 G | 5.02 | 11.41 | |
| | | Blue | 8.98 PB | 2.90 | 9.80 | |
| | | Cyan | 7.51 B | 5.62 | 11.94 | |
| | | Magenta | 4.93 RP | 4.94 | 15.31 | |
| | | Yellow | 7.17 Y | 9.10 | 12.27 | |
| 28 | GB | Red | 6.26 R | 4.83 | 14.06 | 997 |
| | | Green | 1.83 G | 5.18 | 11.96 | |
| | | Blue | 8.47 PB | 2.93 | 11.94 | |
| | | Cyan | 7.39 B | 5.83 | 11.83 | |
| | | Magenta | 2.88 RP | 5.02 | 16.75 | |
| | | Yellow | 6.81 Y | 9.08 | 12.85 | |
| 28 | SH | Red | 6.34 R | 4.91 | 13.39 | 970 |
| | | Green | 1.86 G | 5.29 | 12.10 | |
| | | Blue | 8.33 PB | 3.04 | 11.96 | |
| | | Cyan | 690 B | 5.86 | 11.74 | |
| | | Magenta | 3.08 RP | 5.00 | 16.02 | |

TABLE 3-continued

| Example | Paper | Color | Hue | Value | Chroma | Gamut |
|---|---|---|---|---|---|---|
| | | Yellow | 6.88 Y | 9.01 | 12.36 | |
| | HAM | Red | 6.47 R | 4.92 | 13.52 | 939 |
| | | Green | 1.68 G | 5.18 | 11.64 | |
| | | Blue | 8.45 PB | 3.11 | 11.48 | |
| | | Cyan | 6.91 B | 5.80 | 11.62 | |
| | | Magenta | 3.03 RP | 4.93 | 16.09 | |
| | | Yellow | 6.62 Y | 8.91 | 12.5 | |

1. GB = Gilbert ® bond paper (25% cotton); style 1057 (Mead Company, Dayton, Ohio)
2. SH = Springhill Relay ® DP (International Paper, Tuxedo, NY)
3. HAM = Hammermill Fore ® DP (Hammerhill Papers, Erie, PA)

The inks of Example 27 had the same dye concentration as the inks of Example 26, but the inks of Example 27 contained an anti-curl agent. The data illustrates a significant improvement (26%) in plain-paper color gamut by addition the anti-curl agent. Example 28, which is identical to Example 27 except for the dye concentrations, had improved color gamut (5% increase) and improved blue chroma (18% increase).

What is claimed is:

1. A process for reducing paper curl in plain-paper printed elements consisting essentially of the step of applying an ink composition to a plain-paper substrate, said ink composition comprising an aqueous carrier medium, a colorant and at least one anti-curl agent in an amount sufficient to substantially eliminate curl in said plain-paper substrate, wherein the anti-curl agent has a solubility in water of at least 4.5% at 25° C. and is selected from the group consisting of:

(a) 1,3-diols, 1,3,5-triols, amino-1,3-diols and polyoxyalkylene derivatives thereof having the following structure:

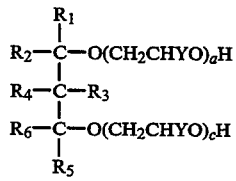

wherein $R_1$, $R_2$, $R_4$, $R_5$ and $R_6$ are independently H; $C_nH_{2n+1}$, where $n=1-4$; or $C_nH_{2n}O(CH_2CHYO)_bH$ where $n=1-6$ and $b=0-25$;

$R_3=H$; $C_nH_{2n+1}$ where $n=1-4$; $C_nH_{2n}O(CH_2CHYO)_bH$ where $n=1-6$ and $b=0-25$; or $(CH_2)_eNXZ$, where X and Z are independently H, $CH_3$, $C_2H_5$ or $C_2H_4O(CH_2CHYO)_dH$, where $d=0-25$ and $e=0-3$;

$Y=H$ or $CH_3$;

a and c are independently 0-25; and wherein the total number of $CH_2CHYO$ units is 0-100;

(b) polyols and oxyalkylene derivatives thereof having the following structure:

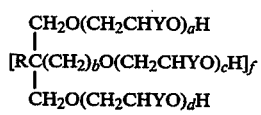

wherein R is independently H, $C_nH_{2n+1}$, where $n=1-4$ or $CH_2O(CH_2CHYO)_eH$;

$Y=H$ or $CH_3$, $b=0$ or 1;

a, c, d and e are independently 0-40, f=1-6; and wherein the total number of $CH_2CHYO$ units is 0-100;

with the proviso that when a, b, c and d=0, and f=1, R is not H and when a, c, and d=0 and b and f=1, then R is $CH_2O(CH_2CHYO)_eH$ and e is not 0;

(c) compounds having the following structure:

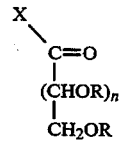

wherein X=H; OH; $CH_2O(CH_2CHYO)_aH$; $O(CH_2CHYO)_bH$; or OM where M is a metal cation;

n=2-7;

R=$(CH_2CHYO)_cH$, where Y=H or $CH_3$;

a, b and c are independently 0-25; and wherein the total number of $CH_2CHYO$ units is 0-125;

(d) pyranosides and polyalkoxyalkylene derivatives thereof having the following structure:

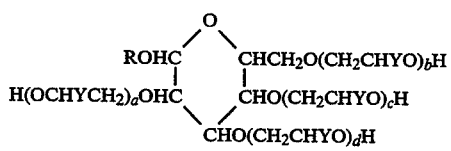

wherein R=H or $C_nH_{2n+1}$, where $n=1-4$ a, b, c and d are independently 0-30;

Y=H or $CH_3$; and wherein the total number of $CH_2CHYO$ units is 0-120;

(e) poly (oxyalkylene) compounds having the following structure:

wherein Y=H or $CH_3$, and x=3-20; and (f) polyoxyalkylene derivatives of aliphatic polyamines having the structure:

wherein $Z_1$, $Z_2$, $Z_3$, or $Z_4$ are independently $(CH_2CHYO)_aH$ wherein Y=H or $CH_3$;

n=1-20;

a is independently 0-20; and wherein the total number of $CH_2CHYO$ units is 3-200.

2. The process of claim 1, wherein the anti-curl agent is a compound having structure (a).

3. The process of claim 1, wherein the anti-curl agent is a compound having structure (b).

4. The process of claim 1, wherein the anti-curl agent is a compound having structure (c).

5. The process of claim 1, wherein the anti-curl agent is a compound having structure (d).

6. The process of claim 1, wherein the anti-curl agent is a compound having structure (e).

7. The process of claim 1, wherein the anti-curl agent is a compound having structure (f).

8. The process of claim 1, wherein said colorant comprises a pigment and a polymeric dispersant.

9. The process of claim 1, wherein the colorant comprises a dye.

10. The process of claim 9, wherein said ink composition further comprises a polymer selected from the group consisting of AB block polymers, BAB block polymers, ABC block polymers and random polymers.

11. The process of claim 1, wherein said ink composition comprises an ink jet ink and wherein said step of applying said ink to a substrate comprises applying said ink with an ink jet printer.

* * * * *